Patented Apr. 17, 1934

1,954,836

UNITED STATES PATENT OFFICE 1,954,836

PROTECTIVE COATING COMPOSITION

Victor H. Turkington, Caldwell, N. J., assignor to Bakelite Corporation, New York, N. Y., a corporation of Delaware No Drawing. Application July 20, 1928, Serial No. 294,316

6 Claims. (Cl. 134—26)

This invention relates to compositions of a resinous character, more particularly to liquid coating compositions or varnishes containing them and to their preparation.

Varnishes in general use for covering metal or wood have in the past been mainly of the type that includes as an essential ingredient a drying oil which oxidizes to a tough, gelatinous, impermeable film upon exposure to air. Within recent years another type of coating composition has come into extensive use, namely lacquers formed of nitrocellulose or other cellulose esters in suitable volatile solvents, for the reason that a lacquer deposits a homogeneous dry film directly upon evaporation in air of the solvent, thus avoiding the extensive drying or storage space and dust-free conditions of operation required with the use of an oil varnish.

Nitrocellulose lacquers, however, though fast drying, are decidedly inferior to oil varnishes in adhesion, imperviousness to water and gases, elasticity, etc., and in their clear (unpigmented) form quickly disintegrate when exposed to sunlight. Furthermore, due to the soluble nature of the nitrocellulose film, it is not feasible to brush a second lacquer coating over the first without destruction of the film to some degree; and the addition of a drying oil as such to a lacquer in amounts to give or approximate a non-permeable film obviously defeats the distinctive property of rapid drying to which lacquers owe their popularity.

The present invention provides coating compositions having the characteristic lacquer quality of depositing a film that dries quickly to a hard dust-free and impression-resisting condition, but likewise possessing excellent gloss, adhesion, imperviousness and resistance to light characteristic of oil varnishes. It rests upon the discovery that, in place of attempting to impart oil varnish characteristics to lacquers by the inclusion of drying oils or their equivalent, the rapid air drying and other film characteristics of lacquers can be imparted to a greater or less degree to oil varnishes generally, and with marked success to varnishes which in addition to having the desirable properties of oil varnishes possess other properties which differentiate them as hereinafter set forth.

Oil varnishes include a resinous or equivalent ingredient to give body to the deposited film, and synthetic resins of the phenol formaldehyde type have been made available for this purpose by melting them with a natural resin, such as rosin, to give them oil-soluble properties (see the patent to Berend 1,191,390 July 18, 1916). As such varnishes depend upon oxidation to harden the film, they are necessarily of the slow drying type.

In a co-pending application now Patent No. 1,677,417 granted July 17, 1928, however, I have disclosed a resinous composition prepared by reacting a fatty oil, specifically tung oil, with phenol in the presence of a converting agent in accordance with the disclosure of a U. S. Patent 1,590,079 granted to Byck June 22, 1926, to give a complex phenolic substance; to this is added a methylene-containing body, such as formaldehyde, in amount sufficient to combine with the phenol, together with a non-phenolic resin, such as rosin or copal, in proportions that can be varied within wide limits to act as a blending agent, the mixture being heated until a clear product is obtained. While such a product has the property of an oleo-resinous composition of being soluble in toluene, xylene, etc., it differs from the latter in that oil is chemically combined with the resinous constituent, and the varnish or solution has the property of depositing satisfactory films directly upon evaporation of the solvents and without dependence upon oxidation.

I have found that the drying period of all such varnishes is materially shortened and the film characteristics improved by adding to oleo-resinous varnishes, and more particularly to complex-phenolic varnishes of the nature above described, suitable amounts of nitro-cellulose or other esters of cellulose. Such additions are preferably made in small proportions, about 5 to 10 per cent by weight of the total solids and less than 20 per cent; for if added in relatively large proportions, the desirable properties of the oil varnish are correspondingly decreased without material gain as to the lacquer characteristics. When restricted to small proportions, the cellulose ester has the apparent effect of lessening or removing the tackiness of a freshly deposited film, thus speeding the drying operation and promoting the impression-resisting condition. This may be explained on the theory that the ester addition modifies the impervious film, but without rendering it so porous as to affect the other properties of the composition when kept within the limits designated. With varnishes of the complex phenol type, the nitro-cellulose addition therefore results in products comparable to lacquers in the speed of drying but having the properties of resistance to sunlight, water penetration, etc., associated with oil varnishes.

The preferred mode of incorporating the cellulose ester with the varnish or resinous composition is by solution. As a specific example, 45 parts by weight of the complex phenolic resinous composition first described are dissolved in 55 parts of toluol, and 10 parts by weight of low viscosity nitrocellulose are dissolved in 40 parts of butyl acetate and 50 parts of butyl alcohol, and the two solutions are mixed. Other solvents can be selected, but the solvent combinations should be so chosen that there is enough of the nitrocellulose solvent present to prevent precipitation, and their rates of evaporation balanced so that a clear homogeneous film is deposited by the mixture.

For best results coating compositions herein disclosed should be allowed to age for a few days before applying, otherwise cloudiness of the film is apt to occur. The cloudiness can, however, be avoided by other means, such as the addition of 1 or 2 per cent of butyl phthalate or other suitable agent known and used for this purpose in the lacquer art.

A most useful and surprising technical effect resulting from the addition of cellulose esters to varnishes, as herein disclosed, is the appearance of coatings obtained by their use. Oil varnishes and the complex phenol resinous varnishes yield bright glossy finishes that demand rubbing or toning down for most purposes. The ester addition, however, removes the brightness and yields a satin-like pleasing appearance to the finish without producing the characteristic dullness of lacquers containing high percentages of nitrocellulose.

Another useful property is a sufficient resistance to solvents usually used in varnishes and lacquers when once dried, so that additional coats can be applied by brushing without any objectionable effect on an under coat. It is thus possible to build up durable films of any desired thickness.

Furthermore, in the preferred embodiment of the invention, namely, the use of complex phenolic resinous products in the preparation of the varnish, not only is the deposited film characterized by a rapidity of drying and other properties enumerated, but it possesses flexibility and toughness to the extent that no addition of a plasticizing agent is required to give it durability. In this respect the preferred composition is superior to lacquers, for the addition of a plasticizing agent and the operative step necessary thereto, which is customary in lacquer manufacture, is thus obviated.

The compositions herein described are intended for use in their clear liquid form as such or as vehicles for pigments, dyes, etc. While primarily intended for coating objects, the compositions are useful for other purposes, such as binding media in manufacturing laminated sheets or molding mixtures. Furthermore, other cellulose compounds, as benzyl cellulose, cellulose acetate, cellulose formate, etc., can be substituted for nitrocellulose with equally good results.

I claim:

1. Composition of matter comprising in solution the reaction product of phenol, tung oil, formaldehyde and rosin, and cellulose nitrate in admixture with said product.

2. Composition of matter comprising in solution the reaction product of a phenol, a fatty drying oil and a methylene-containing body, and a cellulose ester in admixture with said product.

3. A process of preparing a coating composition which comprises reacting together a phenol, a fatty oil and a methylene-containing body, dissolving the resinous reaction product in a suitable solvent and mixing therewith a solution of a cellulose ester.

4. Composition of matter comprising a resinous reaction product of a phenolic body and a drying oil in solution with a cellulose ester.

5. Composition of matter comprising in major proportion a drying oil bodied with an oil-soluble phenolic resin to form a varnish and modified by the addition of a minor proportion of a cellulose ester.

6. Composition of matter comprising in major proportion a drying oil bodied with an oil-soluble phenolic resin to form a varnish and in solution with a minor proportion of a cellulose ester.

VICTOR H. TURKINGTON.